B. SMITH.
Cotton Planter.

No. 99,361. Patented Feb. 1, 1870.

Witnesses:
E. W. Anderson
D. D. Kane

Inventor:
Bryan Smith
Chipman Hosmer & Co
Attorneys

United States Patent Office.

BRYAN SMITH, OF FALKLAND, NORTH CAROLINA.

Letters Patent No. 99,361, dated February 1, 1870.

IMPROVEMENT IN COTTON-SEED PLANTER.

The Schedule referred to in these Letters Patent and making part of the same.

*To all whom it may concern:*

Be it known that I, BRYAN SMITH, of Falkland, in the county of Pitt, and State of North Carolina, have invented a new and valuable Improvement in Cotton-Seed Planters; and I do hereby declare that the following is a full, clear, and exact description of the construction and operation of the same, reference being had to the annexed drawings, making a part of this specification, and to the letters and figures of reference marked thereon.

Figure 1 of the drawings is a side view of my invention.

Figure 1:
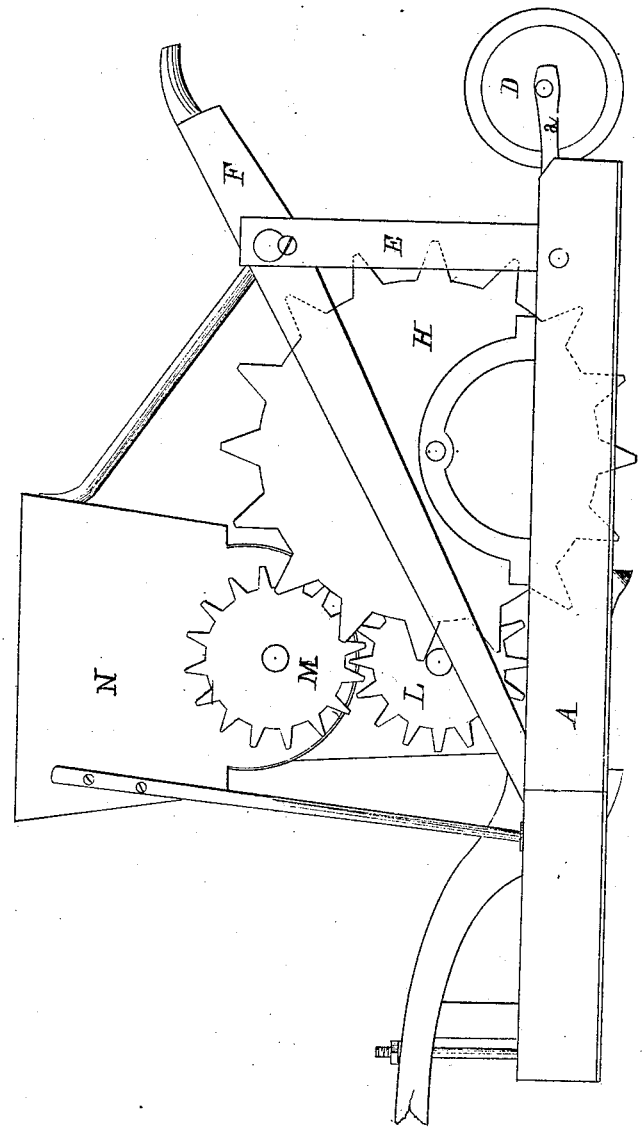
Figure 2:
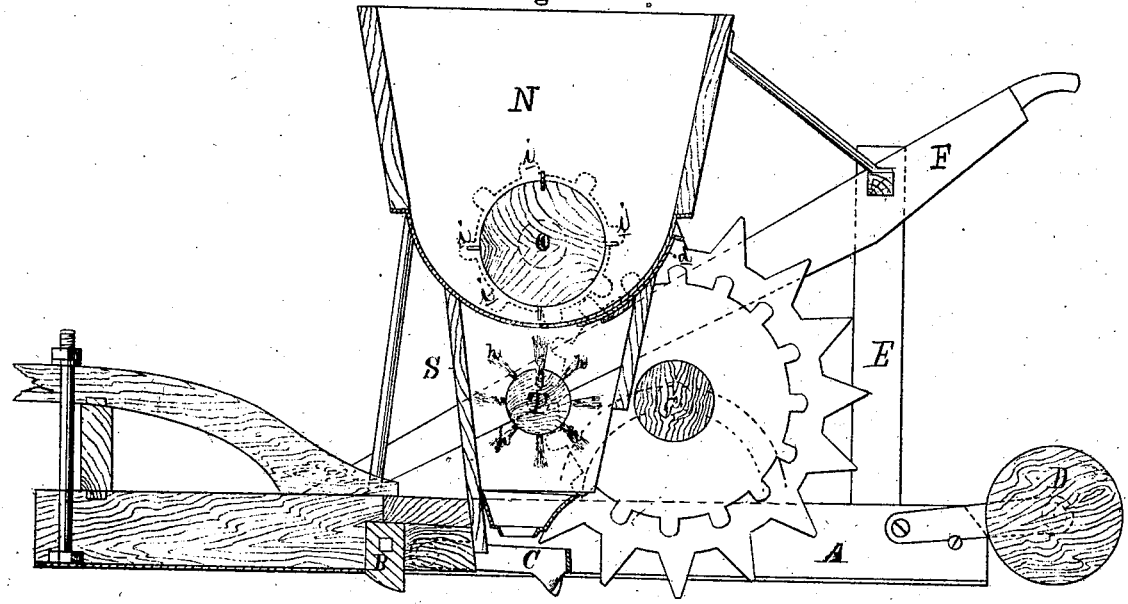
Figure 2 is a central vertical longitudial section of the same.
Figure 3:
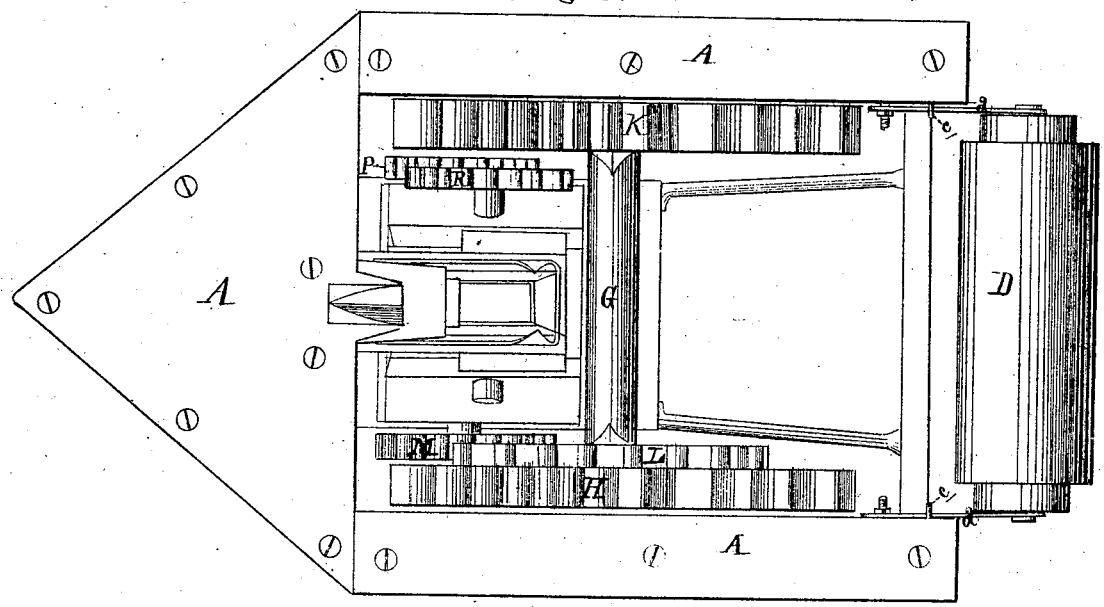
Figure 3 is a bottom view of the same.

My invention relates to machines for planting cotton-seed; and

It consists in a novel arrangement of devices intended to serve as a simple and efficient apparatus for planting said seeds.

A, of the drawings, represents the bed-piece of my planting-machine. It consists of a pointed front and two side-pieces, as shown, all of which have smooth bottom surfaces, covered or shod with iron shoes;

B represents a marker, designed to form a small furrow in the soil for the reception of the seed; and C is a drag with curved side teeth pivoted to a lateral projection of the front of the bed-piece, and intended to serve as a coverer to the seed.

D represents a roller hung loosely to the sides of the bed-piece by means of its arms, *a*, that are pivoted to the inner sides of the bed-pieces, but supported by the pins *c* from falling into hollows.

E represent standards attached to the side-pieces near their rear ends; and

F are the handles, by which the machine is guided.

G represents a revolving shaft, arranged in suitable journal-boxes upon the side-pieces, to each end of which, inside its bearings, I affix a large cog-wheel.

One of these wheels is marked H on the drawings, and the other K. These cogged wheels respectively are designed to have their cogs or teeth extend below the bed-piece, and be rotated by contact with the ground.

The letter L is a small cog-wheel attached to the inner side of the wheel H, and which rotates therewith. Its office is to mesh with, and operate the pinion M, hereinafter mentioned.

N represents my seed-box, constructed with a circular bottom, with apertures therein, which may be opened or closed at will by means of the slides *d*.

O represents a shaft, having its bearings in the sides of the seed-box, and arranged for rotating therein. I attach the pinion M to one end of this shaft, and the pinion P at the other. The pinion M meshes with the wheel L, as described above, while the pinion P is arranged to operate with the pinion R upon shaft T, hereinafter mentioned.

I arrange a box or frame below the seed-box, which is marked S on the drawings, mainly for the purpose of forming bearings for the shaft T, and conducting the seed more nearly to the ground, and providing for cleaning the same.

The shaft T has its bearings in the frame S, and has a cogged wheel outside said frame, which meshes and works with the pinion P upon shaft O.

The letters *h* represent a series of brushes arranged upon the shaft T, which are designed for separating the beards and furze from the seed.

The small spurs or bosses *i* upon the shaft G are intended to aid in forcing the seed downward.

My device is operated as follows:

As the machine is drawn forward, the flat surface of the bottom smoothes and evens the ground. The large cogged wheels are made to rotate the shaft B by its cogs or teeth, which enter the soil below the bed-piece, and the entire revolving machinery is actuated thereby. The seed is cleaned by the brushes, and is dropped into the furrow formed by the marker B. It is covered by the drag C, and the furrow is then rolled and smoothed by the roller D, thereby performing all its work automatically.

What I claim as my invention, and desire to secure by Letters Patent, is—

1. The bed-piece A, with marker B, and drag C, when constructed and arranged to operate as and for the purposes specified.

2. The combination and arrangement of the shafts G, O, and T, with the wheels H, K, L, M, P, and R, seed-box N, slides *d*, and roller D, brushes *h*, and spurs *i*, when constructed and arranged to operate as and for the purposes specified.

In testimony that I claim the above, I have hereunto subscribed my name, in the presence of two witnesses.

BRYAN SMITH.

Witnesses:
DAVID F. WHICHAND,
G. W. COX.